United States Patent [19]
Schipper et al.

[11] Patent Number: 6,072,428
[45] Date of Patent: Jun. 6, 2000

[54] LOCATION DETERMINATION USING DOPPLER AND PSEUDORANGE MEASUREMENTS FROM FEWER THAN FOUR SATELLITES

[75] Inventors: John F. Schipper, Palo Alto; Mark E. Wilson, Sunnyvale, both of Calif.

[73] Assignee: Trimble Navigation Limited, Sunnyvale, Calif.

[21] Appl. No.: 09/090,100

[22] Filed: Jun. 3, 1998

[51] Int. Cl.[7] .............................. H04B 7/185; G01S 5/02
[52] U.S. Cl. ...................... 342/357.01; 701/213
[58] Field of Search .............................. 342/357, 357.01; 701/213, 214

[56] References Cited

U.S. PATENT DOCUMENTS

| | | | |
|---|---|---|---|
| 4,894,662 | 1/1990 | Counselman | 342/357 |
| 5,412,388 | 5/1995 | Attwood | 342/357 |
| 5,412,389 | 5/1995 | Olds | 342/357 |
| 5,430,657 | 7/1995 | Kyrtsos | 364/459 |
| 5,444,450 | 8/1995 | Olds et al. | 342/357 |
| 5,490,073 | 2/1996 | Kyrtsos | 364/449 |
| 5,500,648 | 3/1996 | Maine et al. | 342/357 |
| 5,585,800 | 12/1996 | Chubb | 342/357 |
| 5,590,043 | 12/1996 | McBurney | 342/357 |
| 5,610,615 | 3/1997 | Chiodini | 342/357 |
| 5,666,647 | 9/1997 | Maine | 455/12.1 |
| 5,742,908 | 4/1998 | Dent | 455/517 |

OTHER PUBLICATIONS

C. Moller, "The Theory of Relativity," pp. 62–66, Oxford University Press, 1952.
Keith R. Symon, "Mechanics," pp. 111–115, Addison–Wesley Publishing Co., 1953.
W.H. Guier and G.C. Weiffenbach, "A Satellite Doppler Navigation System," Proceedings of the IRE, pp. 507–516, Apr. 1960.
W.P. Williams, "Marine Satellite Navigation Systems," SERT Journal, pp. 50–54, vol. 13, Mar. 1977.
Theodore Wyatt, "The Gestation of Transit as Perceived by One Participant," Johns Hopkins APL Technical Digest, pp. 32–38, vol. 2, No. 1, 1981.
W.F. Blanchard, "The Continuing Development of 'Transit'," IEE Special Conference on Mobile Communication and Navigation, pp. 189–199, 1983.

*Primary Examiner*—Theodore M. Blum
*Attorney, Agent, or Firm*—John Schipper

[57] ABSTRACT

A method for estimating two or three location coordinates and/or receiver time offset for a receiver that receives and analyzes timed signals transmitted from one, two or three non-geosynchronous satellites (GPS, GLONASS, modified LEO, etc.). Combinations of pseudorange, Doppler shift and/or first time derivative and/or second time derivative of Doppler shift are determined and used to estimate the location coordinates and/or receiver time offset.

16 Claims, 5 Drawing Sheets

6,072,428

LOCATION DETERMINATION USING DOPPLER AND PSEUDORANGE MEASUREMENTS FROM FEWER THAN FOUR SATELLITES

FIELD OF THE INVENTION

This invention relates to use of signals received from fewer than four satellites to determine location of a signal receiver.

BACKGROUND OF THE INVENTION

Location determination (LD) systems, such as the Global Positioning System (GPS), the Global Orbiting Navigational Satellite System (GLONASS) and the Low Earth Orbit (LEO) System, receive and analyze timed signals from a plurality of satellites (usually three or more) in order to estimate the location and time offset of an LD signal receiver. The LD signals received may be used to measure pseudoranges from the receiver to each satellite, carrier phases, signal Doppler shifts and the like, but it is usually necessary to receive and analyze these signals from many satellites in order to estimate the location coordinates and time offset or related quantities.

In some situations, acceptable signals from an adequate number of satellites is not available, because of signal interference from an adjacent urban canyon or other structure(s), because of an unfortunate geometric configuration for the contributing satellites, because of partial or full masking of signals transmitted near the horizon, or because of non-availability of signal processing in one or more receiver channels. What is needed is a signal receiver system that can receive and analyze LD signals from fewer than four satellites to estimate location coordinates and receiver time offset, or other relevant variables. Preferably, the system should work with LD signals received from as few as one or two LD signal sources (usually, but not necessarily, satellites) at substantially the same signal receipt time. Preferably, the system should work with an arbitrary satellite configuration, not merely with satellites in equatorial orbits.

SUMMARY OF THE INVENTION

These needs are met by the invention, which provides method and apparatus that receives LD signals from fewer than four LD signal sources, measures pseudorange, signal Doppler shift and selected time derivatives of Doppler shift, and estimates the location coordinates and time offset ("location fix coordinates") for the LD signal receiver. In one approach, pseudorange and Doppler shift (no time derivatives) for each of two LD signal sources are measured and analyzed to estimate the location fix coordinates. In another approach, pseudorange and Doppler shift (no time derivatives) for a single moving LD signal source are measured and analyzed at two distinct times to estimate the location fix coordinates. In another approach, any two of the pseudorange and the zeroth, first and second time derivatives of Doppler shift at two distinct times are measured and analyzed to estimate the location fix coordinates. In another approach, pseudorange and at least one of the zeroth, first and second time derivatives of Doppler shift for a single moving LD signal source are measured and analyzed at two distinct times to estimate the location fix coordinates. In another approach, pseudorange, Doppler shift and the first and second time derivatives of Doppler shift are measured and analyzed at a selected time to estimate the location fix coordinates. In another approach, any combination of four of the pseudorange and the zeroth, first and second time derivatives of Doppler shift at two or more distinct times are measured and analyzed to estimate the location fix coordinates. If one or more of the location fix coordinates ($x_r, y_r, z_r, b_r$) is known, the number of measurements is reduced accordingly.

DESCRIPTION OF BEST MODES OF THE INVENTION

Figure 1:
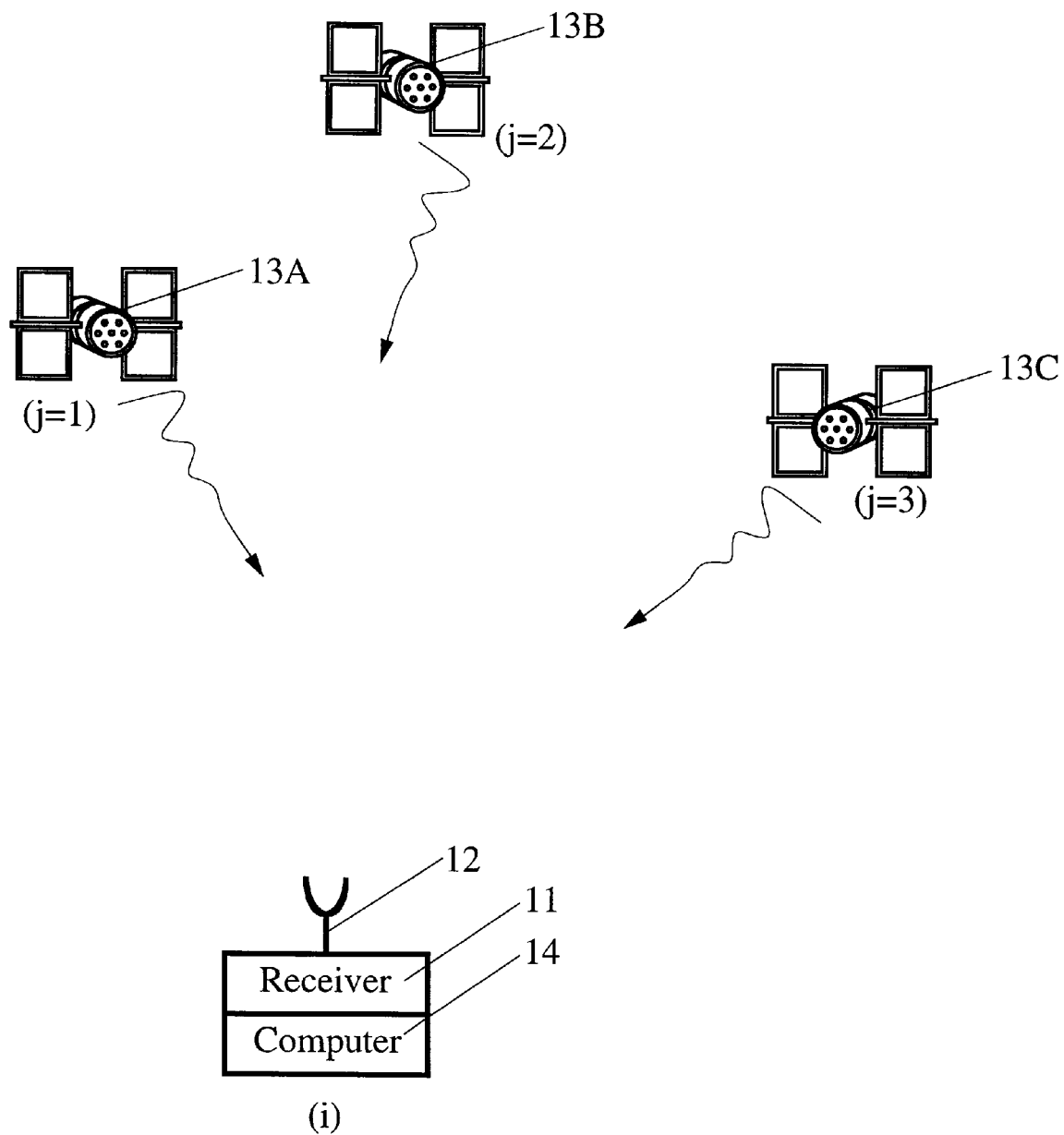
FIG. 1 illustrates a situation in which the invention can be used.

In FIG. 1, an LD signal antenna 12 and receiver 11 (referred to collectively as an "LD receiver") receives LD signals from one or more moving LD signal sources 13A, 13B, 13C, whose location coordinates are known as a function of time t and which move relative to the receiver. The LD receiver 11 rotates with the Earth's surface, has initial location coordinates ($x_{r0}, y_{r0}, z_{r0}$), and has fixed receiver time offset $\Delta t_r$ with $b_r = c \cdot \Delta t_r$, where c is the velocity of light in the ambient medium. The location fix coordinates ($x_r, y_r, z_r, b_r$) for the LD receiver 11 are to be estimated, using LD signals received from one, two or three LD signal sources.

The LD signal receiver 11 occupies a fixed location relative to the Earth's surface as the Earth rotates on its axis. Expressed as a function of time relative to an absolute coordinate system in space, the location coordinates for the LD receiver 11 can be expressed in a Cartesian system, with origin at the Earth's center of rotation and z-axis coinciding with the Earth's rotation axis, as $$x_r(t) = x_{r0} \cos \omega_e(t-t0) + y_{r0} \sin \omega_e(t-t0), \tag{1}$$

$$y_r(t) = -x_{r0} \sin \omega_e(t-t0) + y_{r0} \cos \omega_e(t-t0), \tag{2}$$

$$z_r(t) = z_{r0}, \tag{3}$$

where $x_{r0}$, $y_{r0}$ and $z_{r0}$ are the (unknown) location coordinate values of the LD receiver at a selected time $t' = t-t0$ and $\omega_e$ is the known angular velocity of the Earth.

The first, second and third time derivatives of the location coordinates for the LD signal receiver 11 are found to be $$\partial x_r/\partial t = \omega_e\{-x_{r0} \sin \omega_e(t-t0) + y_{r0} \cos \omega_e(t-t0)\}, \tag{4}$$

$$\partial y_r/\partial t = \omega_e\{-x_{r0} \cos \omega_e(t-t0) - y_{r0} \sin \omega_e(t-t0)\}, \tag{5}$$

$$\partial z_r/\partial t = 0, \tag{6}$$

$$\partial^2 x_r/\partial t^2 = \omega_e^2\{-x_{r0} \cos \omega_e(t-t0) - y_{r0} \sin \omega_e(t-t0)\}, \tag{7}$$

$$\partial^2 x_r/\partial t^2 = \omega_e^2\{-x_{r0} \sin \omega_e(t-t0) - y_{r0} \cos \omega_e(t-t0)\}, \tag{8}$$

$$\partial^2 z_r/\partial t^2 = 0, \tag{9}$$

$$\partial^3 x_r/\partial t^3 = \omega_e^3\{x_{r0} \sin \omega_e(t-t0) - y_{r0} \cos \omega_e(t-t0)\}, \tag{10}$$

$$\partial^3 y_r/\partial t^3 = \omega_e^3\{x_{r0} \cos \omega_e(t-t0) + y_{r0} \sin \omega_e(t-t0)\}, \tag{11}$$

$$\partial^3 z_r/\partial t^3 = 0. \tag{12}$$

The LD signal source(s) is/are assumed to be moving, with known location coordinates as a function of time. For definiteness, each LD signal source is assumed to be carried on a satellite that revolves around the Earth in a circular orbit of radius a with an orbital plane that includes the center of the Earth. Each satellite rotates with a known characteristic angular velocity $\omega_s$, in an orbital plane that is described by a known azimuthal angle $\phi$ and by a known angle $\theta$ that this plane makes with the equatorial line on the Earth. A satellite thus has a time-varying location given by the Cartesian coordinates $$x_s(t) = a \cos\phi \cos\theta \cos\omega_s t'' + a \sin\phi \sin\omega_s t'', \quad (13)$$

$$y_s(t) = -a \sin\phi \cos\theta \cos\omega_s t'' + a \cos\phi \sin\omega_s t'', \quad (14)$$

$$z_s(t) = a \sin\theta \cos\omega_s t''. \quad (15)$$

The time variable t" in Eqs. (13)–(15) is a translated time variable t"=t−t(j), to account for the difference in location of each satellite (j). The parameters a, $\omega_s$, $\phi$ and $\theta$ also vary with the satellite (j). The first, second and third time derivatives of the location coordinates of the satellite are found to be $$\partial x_s/\partial t = a\omega_s\{-\cos\phi \cos\theta \sin\omega_s t'' + \sin\phi \cos\omega_s t''\}, \quad (16)$$

$$\partial y_s/\partial t = a\omega_s\{-\sin\phi \cos\theta \sin\omega_s t'' + \cos\phi \cos\omega_s t''\}, \quad (17)$$

$$\partial z_s/\partial t = -a\omega_s \sin\theta \sin\omega_s t'', \quad (18)$$

$$\partial^2 x_s/\partial t^2 = a\omega_s^2\{-\cos\phi \cos\theta \cos\omega_s t'' - \sin\phi \sin\omega_s t''\}, \quad (19)$$

$$\partial^2 y_s/\partial t^2 = a\omega_s^2\{-\sin\phi \cos\theta \cos\omega_s t'' - \cos\phi \sin\omega_s t''\}, \quad (20)$$

$$\partial^2 z_s/\partial t^2 = -a\omega_s^2 \sin\theta \cos\omega_s t'', \quad (21)$$

$$\partial^3 x_s/\partial t^3 = a\omega_s^3\{\cos\phi \cos\theta \sin\omega_s t'' - \sin\phi \cos\omega_s t''\}, \quad (22)$$

$$\partial^3 y_s/\partial t^3 = a\omega_s^3\{-\sin\phi \cos\theta \sin\omega_s t'' - \cos\phi \cos\omega_s t''\}, \quad (23)$$

$$\partial^3 z_s/\partial t^3 = -a\omega_s^3 \sin\theta \sin\omega_s t''. \quad (24)$$

A computer 14 is programmed to handle the computations.

The square of the measured pseudorange is first formed. If the vectors $r_r(t)$ and $r_s(t)$ represent the respective vectors from the coordinate origin to the LD signal receiver (i) and to the satellite (j), the (corrected) pseudorange equation for a selected receiver (i) and a selected satellite (j) becomes $$\Delta r \cdot \Delta r = (r_r(t;i) - r_s(t;j))^2 = (b_r - PR(t;i;j))^2 \quad (25)$$
$$= x_{r0}^2 + y_{r0}^2 + z_{r0}^2 + a^2 - 2a z_{r0}\sin\theta\cos\omega_s t'' -$$
$$2a x_{r0}\{\cos\theta\cos(\omega_e t' - \phi)\cos\omega_s t'' - \sin(\omega_e t' - \phi)\sin\omega_s t''\} -$$
$$2a y_{r0}\{\cos\theta\sin(\omega_e t' - \phi)\cos\omega_s t'' + \cos(\omega_e t' - \phi)\sin\omega_s t''\}$$

The unknowns in Eq. (25) are the location coordinates $x_{r0}$, $y_{r0}$, $z_{r0}$ and the receiver time offset $b_r$ (optionally determined). After simplification, the time derivative of the separation distance (squared) becomes $$\Delta r \cdot \Delta v = (r_r(t;i) - r_s(t;j)) \cdot (v_r(t;i) - v_s(t;j))$$
$$= -a x_{r0}\{-\omega_e \cos\theta\sin(\omega_e t' - \phi)s\omega_s t'' -$$
$$\omega_e \cos(\omega_e t' - \phi)\sin\omega_s t'' - \omega_s\cos\theta\cos(\omega_e t' - \phi)\sin\omega_s t'' -$$
$$\omega_s\sin(\omega_e t' - \phi)\cos\omega_s t''\} -$$
$$a y_{r0}\{\omega_e\cos\theta\cos(\omega_e t' - \phi)\cos\omega_s t'' -$$
$$\omega_e\sin(\omega_e t' - \phi)\sin\omega_s t'' - \omega_s\cos\theta\sin(\omega_e t' - \phi)\sin\omega_s t'' +$$
$$\omega_s\cos(\omega_e t' - \phi)\cos\omega_s t''\} + a z_{r0}\omega_s\sin\theta\sin\omega_s t''$$
$$= m_x(t)x_{r0} + m_y(t)y_{r0} + m_z(t)z_{r0},$$

$$m_x(t) = a\{\omega_e \cos\theta \sin(\omega_e t' - \phi) \cos\omega_s t'' + \omega_e \cos(\omega_e t' - \phi)$$
$$\sin\omega_s t'' + \omega_s \cos\theta \cos(\omega_e t' - \phi) \sin\omega_s t'' + \omega_s \sin$$
$$(\omega_e t' - \phi) \cos\omega_s t''\}, \quad (27)$$

$$m_y(t) = a\{-\omega_e \cos\theta \cos(\omega_e t' - \phi) \cos\omega_s t'' + \omega_e \sin(\omega_e t' - \phi)$$
$$\sin\omega_s t'' + \omega_s \cos\theta \sin(\omega_e t' - \phi) \sin\omega_s t'' - \omega_s \cos$$
$$(\omega_e t' - \phi) \cos\omega_s t''\}, \quad (28)$$

$$m_z(t) = \omega_s \sin\theta \sin\omega_s t, \quad (29)$$

$$\Delta v = \partial r_r/\partial t - \partial r_s/\partial t, \quad (30)$$

More generally, an nth power of the quantity $(\Delta r \cdot \Delta v)$ becomes $$(\Delta r \cdot \Delta v)^n = \{m_x(t) \, x_{r0} + m_y(t) \, y_{r0} + m_z(t) \, z_{r0}\}^n. \quad (31)$$

The first time derivative of Doppler shift involves the quantity $$(\partial/\partial t)\{(\Delta r \cdot \Delta v)/|\Delta r|\} = (\Delta r \cdot \Delta u) + (\Delta v \cdot \Delta v) \quad (32)$$
$$= \partial m_x/\partial t)x_{r0} + (\partial m_y/\partial t)y_{r0} + (\partial m_z/\partial t)z_{r0},$$

$$\Delta u = \partial^2 r_r/\partial t^2 - \partial^2 r_s/\partial t^2. \quad (33)$$

The second derivative of Doppler shift involves the quantity $$(\partial^2/\partial t^2)(\Delta r \cdot \Delta v) = (\Delta r \cdot \Delta w) + 2(\Delta v \cdot \Delta u) \quad (34)$$
$$= (\partial^2 m_x/\partial t^2)x_{r0} + (\partial^2 m_y/\partial t^2)y_{r0} +$$
$$(\partial^2 m_z/\partial t^2)z_{r0},$$

$$\Delta w = \partial^3 r_r/\partial t^3 - \partial^3 r_s/\partial t^3. \quad (35)$$

For a first body whose motion can be described by the usual special relativistic equations, the frequency Doppler shift of a signal emitted by that body and received by a second body is given by $$\Delta v(\text{Doppler};t;i;j) = -v_0(\Delta r \cdot \Delta v)/c|\Delta r|, \quad (36)$$

(C. Moller, *The Theory of Relativity*, Oxford Univ. Press, 1952, pp. 58–62), where $\Delta r$ and $\Delta v$ are the first body-second body location vector difference and velocity vector difference, respectively, and $v_0$ is the signal frequency as transmitted by the first body.

Using the cosine law, the quantity $$|\Delta r| = |r_r(t;i) - r_s(t;j)| \quad (37)$$

in the denominator in Eq. (45) can be replaced by an approximation $$|\Delta r| = \{a^2 + a_e^2 - 2 a a_e \cos\psi\}^{1/2}, \quad (38)$$

where $a_e$ is the Earth's radius and $\psi$ is the estimated angle between a vector directed toward the LD signal receiver and a vector directed toward the satellite whose signal is being received ($\pi/2 \leq \psi \leq \pi$). The numerical value $|\Delta r|$ may be written as $\chi(a-a_e)$, where a=26,560 km, $a_e$=7,040 km and $1 \leq \chi \leq \chi(\max) = \{(a+a_e)/(a-a_e)\}^{1/2} = 1.312$ for GPS orbits, and a=25,510 km, $a_e$=7,040 km and $1 \leq \chi \leq \chi(\max) = 1.328$ for GLONASS orbits, for example. Preferably, the quantity $|\Delta r|$ is estimated using a measured pseudorange value.

The first and second time derivatives of the frequency Doppler shift between the first body and the second body are given by $$\partial\{c|\Delta r|\Delta v/v0\}/\partial t=(c|\Delta r|/v_0)\ \partial\Delta v/\partial t-(c\Delta v/v_0)^2=-\Delta v\cdot\Delta v-\Delta r\cdot\Delta u, \quad (39)$$

$$\partial^2\{c|\Delta r|\Delta v/v0\}/\partial t^2=(c|\Delta r|/v_0)\partial^2\Delta v/\partial t^2-3(c/v_0)^2\Delta v\partial\Delta v/\partial t=-2\Delta v\cdot\Delta u-\Delta r\cdot\Delta w. \quad (40)$$

In a first embodiment of the invention, a pseudorange (optional) and Doppler shifts $\Delta v(Doppler;t;i;j)$ are measured for three different (non-collinear) satellites, j=1, 2, 3, at a selected time t=t1. From Eqs. (26), the three Doppler shift relations become $$M(t1;i;1,2,3)X0(3) = G(t1;i;1,2,3), \quad (41)$$

$$M(t1;i;1,2,3) = \begin{bmatrix} m_x(t1;i;1) & m_y(t1;i;1) & m_z(t1;i;1) \\ m_x(t1;i;2) & m_y(t1;i;2) & m_z(t1;i;2) \\ m_x(t1;i;3) & m_y(t1;i;3) & m_z(t1;i;3) \end{bmatrix}, \quad (42)$$

$$X0(3) = \begin{bmatrix} x_{r0} \\ y_{r0} \\ z_{r0} \end{bmatrix}, \quad (43)$$

$$G(t1;i;1,2,3) = \begin{bmatrix} -\Delta vc|\Delta r(t1;i;1)|/v_0 \\ -\Delta vc|\Delta r(t1;i;2)|/v_0 \\ -\Delta vc|\Delta r(t1;i;3)|/v_0 \end{bmatrix}, \quad (44)$$

where the quantities in the 3×3 matrix M and in the 3×1 column vector G are calculated or measured. Equation (40) is then inverted to provide the receiver (initial) location coordinates $$X0(3) = \begin{bmatrix} x_{r0} \\ y_{r0} \\ z_{r0} \end{bmatrix} = M(t1;i;1,2,3)^{-1}\ G(t1;i;1,2,3). \quad (45)$$

The matrix M(t1;i;1,2,3) is invertible, in part because the three satellites are non-collinear. Equations (1), (2) and (3) can be applied to estimate the receiver location coordinates on the rotating Earth at any other time t. If the receiver clock offset $b_r$ is also needed (optional), the pseudorange PR(t1;i;j) is also measured, and Eq. (25) is applied to determine the offset value br.

In a second embodiment, three or four of pseudorange and the zeroth, first and second time derivatives of the Doppler shift for a single satellite (j) are measured and/or calculated for a selected time t=t1. The three Eqs. (36), (39) and (40), supplemented by Eqs. (26), (32) and (34), can be re-expressed in the forms $$M'(t1;i;j)X0(3) = G'(t1;i;1), \quad (46)$$

$$G'(t1;i;j) = \begin{bmatrix} -(c|\Delta r(t1;i;j)|\Delta v/v_0) \\ -(c|\Delta r(t1;i;j)|/v_0)(\partial\Delta v/\partial t)+(c\Delta v/v_0)^2 \\ -(c|\Delta r(t1;i;j)|/v_0)(\partial^2\Delta v/\partial t^2)+(3c^2/v_0^2)\Delta v(\partial\Delta v/\partial t) \end{bmatrix} \quad (47)$$

where $M'(t1;i;j)=(M'_{k1})$ is a 3×3 matrix with entries $$M'_{11}=m_x(t1;i;j), \quad (48)$$

$$M'_{12}=m_y(t1;i;j), \quad (49)$$

$$M'_{13}=m_z(t1;i;j), \quad (50)$$

$$M'_{21}=\partial m_x(t1;i;j)/\partial t, \quad (51)$$

$$M'_{22}=\partial m_y(t1;i;j)/\partial t, \quad (52)$$

$$M'_{23}=\partial m_z(t1;i;j)/t, \quad (53)$$

$$M'_{31}=\partial^2 m_x(t1;i;j)/\partial t^2, \quad (54)$$

$$M'_{32}=\partial^2 m_y(t1;i;j)/\partial t^2, \quad (55)$$

$$M'_{33}=\partial^2 m_z(t1;i;j)/\partial t^2, \quad (56)$$

Equation (46) is then inverted to provide the receiver (initial) location coordinates $$X0(3) = \begin{bmatrix} x_{r0} \\ y_{r0} \\ z_{r0} \end{bmatrix} = M'(t1;i;j)^{-1}\ G'(t1;i;j), \quad (57)$$

The matrix M'(t1;i;1,2,3) should be verified to be invertible by computation of its determinant. Equations (1), (2) and (3) can be applied to estimate the present receiver location coordinates on the rotating Earth at any time t. Equation (25) is applied to estimate the time offset $b_r$ for the receiver, if this quantity is needed. Equations (41), (46) and (71)–(80) are exact if separation distance $|\Delta r(t1;i;j)|$ can be measured or otherwise determined. If receiver clock offset $b_r$ is also needed, the pseudorange PR(t1;i;j) is also measured or calculated, and Eq. (25) is applied to determine the offset value $b_r$.

In a third embodiment of the invention, pseudorange PR(t;i;j) is measured, preferably for at least two satellites, j=j1 and j=j2, and Eq. (25) is rewritten for each of these two satellites in the forms $$(x_r(t;i)-x_s(t;j1))^2+(y_r(t;i)-y_s(t;j1))^2+(z_r(t;i)-z_s(t;j1))^2=(PR(t;i;j1)-b_r)^2, \quad (58)$$

$$(x_r(t;i)-x_s(t;j2))^2+(y_r(t;i)-y_s(t;j2))^2+(z_r(t;i)-z_s(t;j2))^2=(PR(t;i;j2)-b_r)^2. \quad (59)$$

Equation (58) is subtracted from Eq. (59), and the result is rearranged to yield $$\Delta x_s(t;j1;j2)x_r(t;i) + \Delta y_s(t;j1;j2)y_r(t;i) + \\ \Delta z_s(t;j1;j2)z_r(t;i) - \Delta PR(t;i;j1;j2)b_r = \\ \{r_s(t;j1)^2 - r_s(t;j2)^2 + PR(t;i;j2)^2 - PR(t;i;j1)^2\}/2, \quad (60)$$

$$\Delta x_s(t;j1;j2)=x_s(t,j1)-x_s(t,j2), \quad (61)$$

$$\Delta y_s(t;j1;j2)=y_s(t;j1)-y_s(t;j2), \quad (62)$$

$$\Delta z_s(t;j1;j2)=z_s(t;j1)-z_s(t,j2), \quad (63)$$

$$\Delta PR(t;i;j1;j2)=PR(t;i;j1)-PR(t;i;j2), \quad (64)$$

$$r_s(t;j)2=x_s(t;j)^2+y_s(t;j)^2+z_s(t;j)^2. \quad (65)$$

Equation (60) is rewritten in terms of the unknown quantities $x_{r0}$, $y_{r0}$ and $z_{r0}$ as $$\Delta x_s(t;j1;j2)(x_{r0}\cos\omega_e(t-t0)+y_{r0}\sin\omega_e(t-t0))+ \\ \Delta y_s(t;j1;j2)(-x_{r0}\sin\omega_e(t-t0)+y_{r0}\cos\omega_e(t-t0))+ \\ \Delta z_s(t;j1;j2)z_{r0} - \Delta PR(t;i;j1;j2)b_r = Q(t;i;j1;j2), \quad (66)$$

$$Q(t;i;j1;j2)=\{r_s(t,j1)^2-r_s(t;j2)^2+PR(t;i;j2)^2-PR(t;i;j1)^2\}/2, \quad (67)$$

At least two of the following six quantities are also measured: the zeroth, first and second time derivatives of Doppler shift for satellite j=j1; and the zeroth, first and second time derivatives of the Doppler shift for j=j2.

From Eqs. (26) and (46), the zeroth derivative of Doppler shift for a signal received from satellite j may be rearranged to $$m_x(t;i;j)x_{r0}+m_y(t;i;j)y_{r0}+m_z(t;i;j)z_{r0}=-\Delta vc|\Delta r(t;i;j)|/v_0, \quad (68)$$

where the quantities $m_x(t)$, $m_y(t)$, $m_z(t)$ are set forth in Eqs. (27)–(29). From Eq. (39), a first selected combination of zeroth and first time derivatives of the Doppler shift may be expressed as $$(\partial m_x(t;i;j)/\partial t)x_{r0}+(\partial m_y(t;i;j)/\partial t)y_{r0}+(\partial m_z(t;i;j)/\partial t)z_{r0}=-(c|\Delta r(t1;i;j)|/v_0)(\partial \Delta v/\partial t)+(c\Delta v/v_0)^2. \quad (69)$$

From Eqs. (40), a second selected combination of zeroth, first and second time derivatives of the Doppler shift may be expressed as $$(\partial^2 m_x(t;i;j)/\partial t^2)x_{r0}+(\partial^2 m_y(t;i;j)/\partial t^2)y_{r0}+(\partial^2 m_z(t;i;j)/\partial t^2)z_{r0}= -(c|\Delta r(t1;i;j)|/v_0)(\partial^2 \Delta v/\partial t^2)+(3c^2/v_0^2)\Delta v(\partial \Delta v/\partial t). \quad (70)$$

Each of Eqs. (68), (69) and (70) can be expressed in the general form $$M_{x,k}(t;i;j)x_{r0}+M_{y,k}(t;i;j)y_{r0}+M_{z,k}(t;i;j)z_{r0}=G_k(t;i;j), \quad (71)$$

where the index k=0, 1 and 2 corresponds, respectively, to the zeroth time derivative of Doppler shift, the first selected combination of zeroth and first time derivatives of Doppler shift, and the second selected combination of zeroth, first and second time derivatives of Doppler shift, respectively, for a signal received at the receiver (i) from the satellite (j). Because Doppler shift measurements from two satellites (j=j1 and j=j2) are available here, Eq. (71) represents any of six Doppler shift measurement combinations: three for the satellite j=j1 and three for the satellite j=j2.

Two of the six relations (71) are chosen for index values k=k1 and k=k2 and for the satellite indices j=j1 and j=j2, respectively, where j1 may be the same as, or may be different from, j2. If j1=j2, the indices k1 and k2 must differ; if j1≠j2, the index k1 may be the same as, or may be different from, the index k2. These two relations are rewritten in the form $$\begin{bmatrix} M_{x,k1}(t;i;j1) & M_{y,k1}(t;i;j1) \\ M_{x,k2}(t;i;j2) & M_{y,k2}(t;i;j2) \end{bmatrix} \begin{bmatrix} x_{r0} \\ y_{r0} \end{bmatrix} = \begin{bmatrix} G_{k1}(t;i;j1)-M_{z,k1}(t;i;j1) \; z_{r0} \\ G_{k2}(t;i;j2)-M_{z,k2}(t;i;j2) \; z_{r0} \end{bmatrix}, \quad (72)$$

and Eq. (72) is inverted to express $x_{r0}$ and $y_{r0}$ in terms of the unknown $z_{r0}$:

$$x_{r0}=\{M_{y,k2}(t;i;j2)G_{k1}(t;i;j1)-M_{y,k1}(t;i;j1)G_{k2}(t;i;j2)-M_{z,k1}(t;i;j2)z_{r0}\}/(det1), \quad (73)$$

$$y_{r0}=\{-M_{x,k2}(t;i;j2)G_{k1}(t;i;j1)-M_{z,k1}(t;i;j1)z_{r0}+M_{x,k1}(t;i;j1)G_{k2}(t;i;j2)-M_{z,k1}(t;i;j2)z_{r0}\}/(det1), \quad (74)$$

$$det1=M_{x,k1}(t;i;j1)M_{y,k2}(t;i;j2)-M_{x,k2}(t;i;j2)M_{y,k1}(t;i;j1). \quad (75)$$

For simplicity in notation, Eqs. (73) and (74) are rewritten as $$x_{r0}=C_x(t;i;j1;j2)+D_x(t;i;j1;j2)z_{r0}, \quad (76)$$

$$y_{r0}=C_y(t;i;j1;j2)+D_y(t;i;j1;j2)z_{r0}, \quad (77)$$

with the coefficients $C_x$, $D_x$, $C_y$ and $D_y$ thus defined.

Equations (76) and (77) are now used in Eq. (66) to express the unknown $z_{r0}$ in terms of the remaining unknown, $b_r$, $$\{\Delta x_s(t; j1; j2)(D_x\cos\omega_e(t-t0)+D_y\sin\omega_e(t-t0))+ \quad (78)$$
$$\Delta y_s(t; j1; j2)(-D_x\sin\omega_e(t-t0)+D_y\cos\omega_e(t-t0))+$$
$$\Delta z_s(t; i; j1; j2)\}z_{r0}=Q(t; i; j1; j2)-$$
$$\Delta x_s(t; j1; j2)(C_x\cos\omega_e(t-t0)+C_y\sin\omega_e(t-t0))-$$
$$\Delta y_s(t; j1; j2)(-C_x\sin\omega_e(t-t0)+C_y\cos\omega_e(t-t0))+$$
$$\Delta PR(t; i; j1; j2)b_r.$$

For simplicity of notation, Eq. (77) is rewritten as $$z_{r0}=E_z(t;i;j1;j2)+F_z(t;i;j1;j2)b_r. \quad (79)$$

Equations (76), (77) and (79) are then substituted in Eq. (25) to produce a quadratic equation $$(b_r-PR(t; i; j))^2 = (C_x+D_x(E_z+F_zb_r))^2 + (C_y+D_y(E+Fb_r))^2 + \quad (80)$$
$$(E_z+F_zb_r)^2 + a^2 - 2a(E_z+F_zb_r)\sin\theta\cos\omega_s t'' -$$
$$2a(C_x+D_x(E_z+F_zb_r))\{\cos\theta\cos\omega_s t''\cos(\omega_e t'-\phi)+$$
$$\sin\omega_s t'\sin(\omega_e t'-\phi)\} -$$
$$2a(C_y+D_y(E_z+F_zb_r))\{\cos\theta\cos\omega_s t''\sin(\omega_e t'-\phi)+$$
$$\sin\omega_s t''\cos(\omega_e t'-\phi)\}.$$

for the remaining unknown, the clock offset $b_r$, where t'=t−t0 and t''=t−t(j). The quadratic relation (80) is then solved for the clock offset $b_r$; only the more realistic value of $b_r$, close to zero, is accepted here. This value of $b_r$ is used in Eq. (79) to determine the value of $z_{r0}$, and the value for $z_{r0}$ is used in Eqs. (76) and (77) to obtain the values for $x_{r0}$ and $y_{r0}$. Note that the value for clock offset $b_r$ is, or can be, determined in this approach for the third embodiment, whether or not this value is of any intrinsic interest. In other approaches for this third embodiment, a quadratic equation can be developed in terms of one of the other unknowns, $x_{r0}$, $y_{r0}$ or $z_{r0}$, using a similar development, and the value of the clock offset $b_r$ may not need to be computed explicitly.

To recapitulate, this third embodiment uses two pseudo-range measurements, for satellites j=j1 and j=j2, and uses two of the following six combinations of measurements: (1) the zeroth derivative of Doppler shift for satellite j=j1 and/or for satellite j=j2; (2) a first selected combination of the zeroth and first time derivatives of Doppler shift for satellite j=j1 and/or for satellite j=j2; and (3) a second selected combination of the zeroth, first and second time derivatives of Doppler shift for satellite j=j1 and/or for satellite j=j2, where the index values j1 and j2 are chosen independently. An alternate version uses one pseudorange value to obtain $b_r$ (optional) and three of the six combinations to obtain $x_{r0}$, $y_{r0}$ and $z_{r0}$.

Thus far, the development has focused primarily on measurement and analysis of Doppler shift and its time derivatives. This development is extended to pseudorange and its time derivatives by the following observations. Pseudorange PR, after removal of error terms such as satellite clock offset, satellite noise, receiver noise, ionospheric propagation time delay, tropospheric propagation time delay and multipath errors, is approximately equal to the magnitude of the radius vector difference, $$PR(t;i;j) \approx |\Delta r(t;i;j)| = |r_r(t;i) - r_s(t;j)|. \tag{81}$$

The first time derivative of pseudorange becomes $$\partial |\Delta r|/\partial t = \Delta r \cdot \Delta v/|\Delta r| = -(c/v_0)\Delta v, \tag{82}$$

which is the Doppler shift, apart from a constant of proportionality, $-c/v_0$.

Thus, measurement of the zeroth, first and second time derivatives of Doppler shift is substantially the same as measurement of the first, second and third time derivatives, respectively, of pseudorange. One can thus work with multiple time derivatives of pseudorange and/or with multiple time derivatives of Doppler shift (including the zeroth derivative) within the same formalism. For ease of reference, pseudorange measurement values and Doppler shift measurement values from a selected satellite to an LD signal receiver are collectively referred to as "location signal measurement" (LSM) values.

Figure 2:
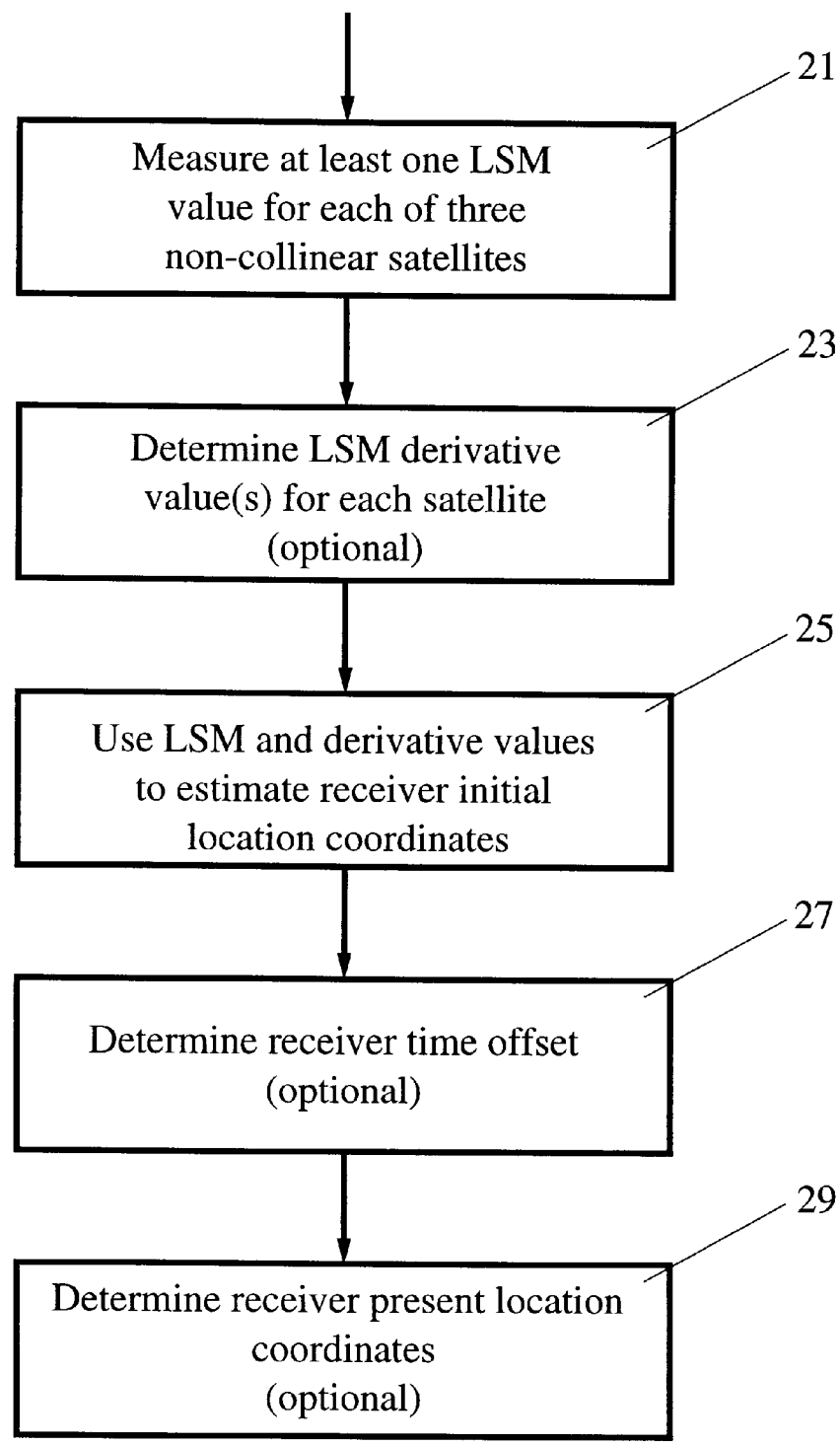
FIGS. 2–4 are flow charts illustrating methods to practice the invention.

FIG. 2 is a flow chart illustrating the first embodiment of the invention. In step 21, at least one LSM value (pseudorange or Doppler shift) is determined for three non-collinear satellites. In step 23 (optional), LSM values for the three satellites (e.g., entries of the matrix M(t1;i;1;2;3) in Eq. (42)) are determined. In step 25, the initial location coordinates $x_{r0}$, $y_{r0}$ and $z_{r0}$ are determined, using Eq. (45) or equivalent. In step 27 (optional), the receiver time offset $b_r$ is determined, using the pseudorange measurement in Eq. (25) or some other approach. In step 29 (optional), the present location coordinates $x_r(t)$, $y_r(t)$ and $z_r(t)$ are determined, using Eqs. (1), (2) and (3) or some other suitable equations.

Figure 3:
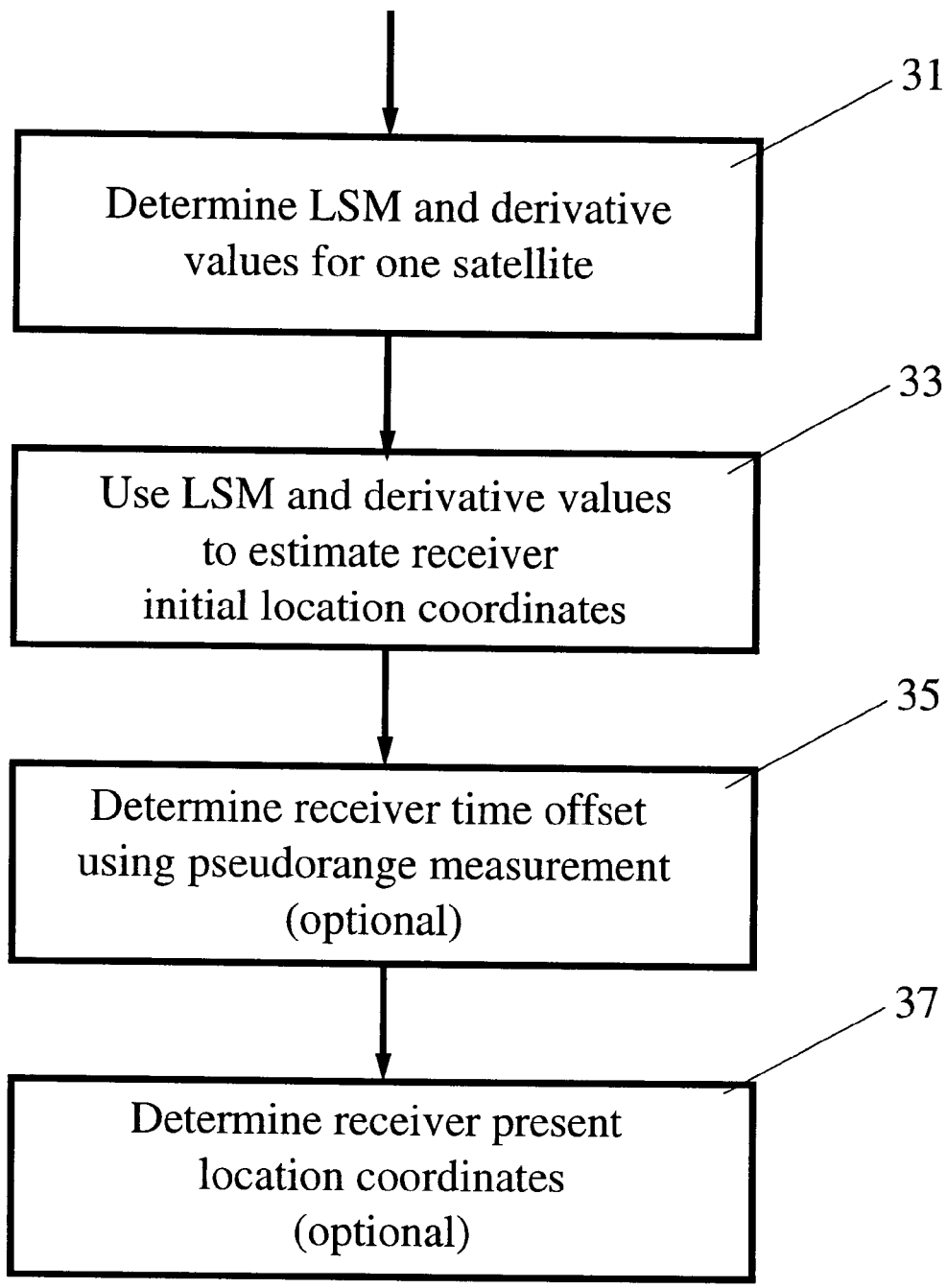

FIG. 3 is a flow chart illustrating the second embodiment. In step 31, three or four LSM and/or LSM derivative values (pseudorange, zeroth, first and second time derivatives of Doppler shift) are determined for a single satellite. In step 33, LSM and derivative values for the entries of the matrix M'(t1;i;j) in Eq. (46) are used to determine the initial location coordinates $x_{r0}$, $y_{r0}$ and $z_{r0}$, using Eqs. (46) or (57). In step 35 (optional), the receiver time offset $b_r$ is determined, using Eq. (25) or some other approach. In step 37 (optional), the present location coordinates $x_r(t)$, $y_r(t)$ and $z_r(t)$ are determined, using Eqs. (1), (2) and (3) or some other suitable equations.

Figure 4:
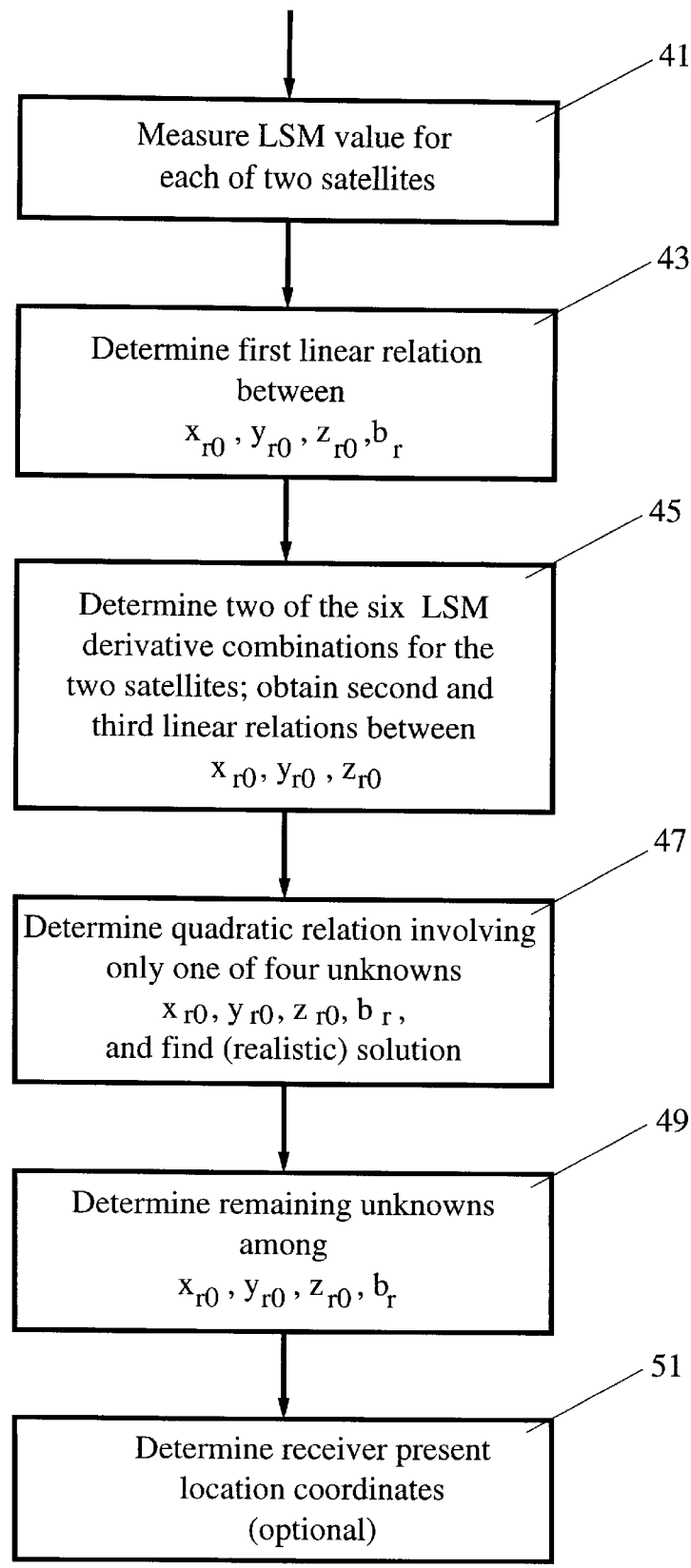

FIG. 4 is a flow chart illustrating the third embodiment of the invention. In step 41, a first LSM value (preferably pseudorange) for each of two satellites (j=j1 and j=j2) is measured. In step 43, a first linear relation (corresponding to Eq. (66)) is obtained between the four unknowns $x_{r0}$, $y_{r0}$, $z_{r0}$, and $b_r$. In step 45, third and fourth LSM values (two of the six Doppler shift time derivative combinations) are measured, and second and third linear relations are obtained between three of the unknowns $x_{r0}$, $y_{r0}$ and $z_{r0}$. In step 47, a quadratic relation involving only one of the four unknowns $x_{r0}$, $y_{r0}$, $z_{r0}$, and $b_r$ is obtained, using the first, second and third linear relations, and a (realistic) solution is determined. In step 49, the remaining initial receiver location fix coordinates, $x_{r0}$, $y_{r0}$, $z_{r0}$, and $b_r$, (or of three location fix coordinates, if the value of $b_r$ or of one of the other location fix coordinates is not of interest) are computed. In step 51 (optional), the present location coordinates $x_r(t)$, $y_r(t)$ and $z_r(t)$ are determined, using Eqs. (1), (2) and (3) or some other suitable equations For any embodiment, if three or fewer receiver location fix coordinates are to be estimated, for example, because the remaining coordinates are known, the total number of zeroth, first and second time derivatives of Doppler shift is reduced correspondingly. For example, if only two location coordinates are estimated, only two of the three Doppler shift derivatives need be measured from a single satellite, or from one Doppler shift derivative from each of two satellites. Measurement of pseudorange from one satellite plus Doppler shift(s) allows determination of clock offset. If pseudoranges are measured from two or more satellites, the number of Doppler shift derivative measurements is reduced by two, as shown in the preceding development.

The time derivatives for an LSM value can be estimated by at least two approaches. In a first, straightforward approach, LSM values L(t;i,j) are measured from signals received at a receiver (i) from a selected LD signal source (j) at a sequence of times $t=\tau 1, \tau 2, \tau 3, \tau 4, \ldots$ that satisfy $\tau 1 < \tau 2 \leq \tau 3 < \tau 4 < \ldots$ A first time derivative of the LSM value at $t=\tau 2$ is defined as $$dL(t = \tau 2)/dt = \{(L(\tau 2) - L(\tau 1))/(\tau 2 - \tau 1) + \tag{83}$$
$$(L(\tau 3) - L(\tau 2))/(\tau 3 - \tau 2)\}/2$$
$$= \{-L(\tau 1)(\tau 3 - \tau 2) + L(\tau 2)(\tau 1 - 2\tau 2 + \tau 3) +$$
$$L(\tau 3)(\tau 2 - \tau 1)\}/2(\tau 3 - \tau 2)(\tau 2 - \tau 1),$$

where the dependence upon receiver index (i) and upon LD signal source index (j) are suppressed here to simplify the notation. A second time derivative of LSM value at a time $t=\tau 2'=(\tau 2+t3)/2$ is defined as $$d^2 L(t = \tau 2)/dt^2 = \{(L(\tau 2) - L(\tau 2))/(\tau 3 - \tau 2) - \tag{84}$$
$$(L(\tau 2) - L(\tau 1))/(\tau 2 - \tau 1)\}/\{(\tau 3 + \tau 2)/2 -$$
$$(\tau 2 + \tau 1)/2\}$$
$$= 2\{(\tau 3 - \tau 2)L(\tau 1) - L(\tau 2)(\tau 3 - \tau 1) +$$
$$(\tau 2 - \tau 1)L(\tau 3)\}/\{(\tau 3 - \tau 2)(\tau 3 - \tau 1)(\tau 2 - \tau 1)\}.$$

Users of this first approach to determining LSM value time derivatives may experience difficulties with reduced signal-to-noise (S/N) ratios because of the definitions adopted for the derivatives in Eqs. (83) and (84).

In a second approach, the S/N ratio is not reduced as severely, but the required computation is increased. In a first variation of the second approach, the LSM value is measured at several distinct values $t=\tau k (k=1, 2, 3, 4, \ldots)$, with $\tau 1 < \tau 2 < \tau 3 < \tau 4 < \ldots$, and LSM values for intermediate values $(\tau 1 < t < \tau 4)$ are defined by interpolation as $$L(t;2) = L(\tau 2) + A(t-\tau 2) + B(t-\tau 2)^2 + C(t-t2)^3 (\tau 1 \leq t \leq \tau 4), \tag{85}$$

$$\begin{bmatrix} A \\ B \\ C \end{bmatrix} = (det3)^{-1} \begin{bmatrix} \tau 2 - \tau 1 & (\tau 2 - \tau 1)^2 & (\tau 2 - \tau 1)^3 \\ \tau 3 - \tau 1 & (\tau 3 - \tau 1)^2 & (\tau 3 - \tau 1)^3 \\ \tau 4 - \tau 1 & (\tau 4 - \tau 1)^2 & (\tau 4 - \tau 1)^3 \end{bmatrix}^{-1} \begin{bmatrix} L(\tau 2) - L(\tau 1) \\ L(\tau 3) - L(\tau 1) \\ L(\tau 4) - L(\tau 1) \end{bmatrix}, \tag{86}$$

$$det3 = (\tau 3 - \tau 1)(\tau 3 - \tau 2)(\tau 2 - \tau 1)(\tau 4 - \tau 2)(\tau 4 - \tau 3)(\tau 3 - \tau 2), \tag{87}$$

and the time derivatives at $t=\tau 2$ become $$dL(t=\tau 2)/dt=A, \tag{88}$$

$$d^2 L(t=\tau 2)/dt^2 = 2B, \tag{89}$$

$$d^3 L(t=\tau 2)/dt^3 = 6C. \tag{90}$$

Polynomials of degree higher than the second, third or fourth degree polynomials used in Eqs. (85) and (92) can also be used to determine the first and second derivatives of the LSM values, by an obvious extension of the development in Eqs. (85)–(90).

In a third approach, M not-necessarily-consecutive values (M≧3) of LSM values L(τm) are measured and a polynomial in t of degree M'(≦M−2) is chosen to pass as closely as possible, according to a selected criterion, to each of the measured LSM values. For example, the polynomial may be $$P(t; M') = \sum_{k=0}^{M'} p_k t^k, (M' \leq M - 2) \tag{91}$$

and the criterion may be least squares minimization of the collective error associated with the M measured values, by suitable choices of the polynomial coefficients $p_k$ (k=0, 1, ..., M'):

$$\varepsilon(p_k) = \sum_{m=1}^{M} \{P(\tau m; M') - L(\tau m)\}^2. \tag{92}$$

$$\partial \varepsilon / \partial p_k = 2 \sum_{m=1}^{M} (\tau m)^k \left\{ \sum_{j=0}^{M'} p_j (\tau m)^j - L(\tau m) \right\} = 0. \tag{93}$$

Equations (93) provide a linear system of M'+1 relations in the polynomial coefficients $p_j$, which can be solved by standard linear algebra techniques. The first and second derivatives of LSM values are then estimated as $$dP/dt = \sum_{k=1}^{M'} k p_k t^{k-1}, \tag{94}$$

$$d^2 P/dt^2 = \sum_{k=2}^{M'} k(k-1) p_k t^{k-2}, \tag{95}$$

$$d^3 P/dt^3 = \sum_{k=3}^{M'} k(k-1)(k-2) p_k t^{k-3}, \tag{96}$$

which can be evaluated for any selected time t (with arbitrary time origin).

Whether the first approach, the second approach, the third approach, or some other reasonable approach is used here to estimate the first and second derivatives of LSM values from (only) the measured LSM values, the estimates for these derivatives will each be a linear combination of a plurality of measured values L(τk) (k=1, 2, 3, 4, ... ). At least two such measured values and at least three measured values of LSM values are required to estimate the first derivative and the second derivative, respectively.

Another method for obtaining equations relating LSM values and their time derivatives to (stationary) receiver location coordinates makes use of the circular rotation of the receiver about the Earth's rotational axis and of the circular rotation of the satellite (LD signal source) about the Earth. If $r_r(t;i)$ and $r_s(t;j)$ represent the present radius vectors (relative to the Earth's center or another common origin) of the receiver (i) and the satellite (j), respectively, the time derivatives of these quantities may be expressed as $$dr_r(t;i)/dt = \omega_r \wedge r_r(t;i), \tag{97}$$

$$d^n r_r(t;i)/dt^n = \omega_r \wedge d^{n-1} r_r(t;i)/dt^{n-1} (n=2, 3, \ldots), \tag{98}$$

$$dr_s(t;j)/dt = \omega_s \wedge r_s(t;j), \tag{99}$$

$$d^n r_s(t;j)/dt^n = \omega_s \wedge d^{n-1} r_s(t;j)/dt^{n-1} (n=2, 3, \ldots), \tag{100}$$

where $\omega_r$ or and $\omega_s$ are the respective angular velocity vectors (constant, with dimensions sec$^{-1}$) associated with the rotation of the (stationary) receiver about the Earth's axis and with the rotation of the satellite about the Earth. Using the notations introduced in Eqs. (25), (30), (33) and (35), the zeroth, first and second Doppler shift derivatives are expressed as $$\begin{aligned} c|\Delta r|\Delta \nu / \nu_0 &= -\Delta r \cdot \Delta v \\ &= -(r_r - r_s) \cdot (\omega_r \wedge r_r - \omega_s \wedge r_s) \\ &= ((\omega_s - \omega_r) \wedge r_s) \cdot r_r, \end{aligned} \tag{101}$$

$$\begin{aligned} (d/dt)\{c|\Delta r|\Delta \nu / \nu_0\} &= (c/\nu_0)|\Delta r|d\Delta \nu / dt - (c\Delta \nu / \nu_0)^2 \\ &= -\{\Delta r \cdot \Delta u + \Delta v \cdot \Delta v\} \\ &= (\omega_r \cdot r_s)(\omega_r \cdot r_r) + (\omega_s \cdot r_s)(\omega_s \cdot r_r) + \\ &\quad (\omega_r^2 + \omega_s^2) r_s \cdot r_r, \end{aligned} \tag{102}$$

$$\begin{aligned} (d^2/dt^2)\{c|\Delta r|\Delta \nu / \nu_0\} &= (c|\Delta r|/\nu_0) d^2 \Delta \nu / dt^2 - \\ &\quad 3(c/\nu_0)^2 \Delta v d \Delta \nu / dt \\ &= -\{(\omega_r^2 \omega_s - \omega_s^2 \omega_r) \wedge r_s \cdot r_r + \\ &\quad 2(\omega_r^2 \omega_s - \omega_s^2 \omega_r) \wedge r_s \cdot r_r) - \\ &\quad 2((\omega_r \wedge \omega_s) \cdot r_s)(\omega_r \cdot r_r) - \\ &\quad 2(\omega_s \cdot r_s)((\omega_s \wedge \omega_r) \cdot r_r)\}. \end{aligned} \tag{103}$$

Each of the Eqs. (101)–(103) is a scalar equation, linear in the three unknown components ($x_r$(t;i),$y_r$(t;i),$z_r$(t;i)) of the vector $r_r$, with coefficients that are either constant or are known functions of t. The left hand sides of the Eqs. (101)–(103) are measurable combinations of the zeroth, first and second derivatives of Doppler shift (multiplied in some instances by the quantity $|\Delta r(t;i;j)|$). These three scalar equations are expressed in matrix form as $$M''(t;i;j1;j2;j3)X03 = G''(t;i;j1;j2;j3), \tag{104}$$

$$M''_{11} = (\omega_{s,y} - \omega_{r,y}) z_s(t,j1) - (\omega_{s,z} - \omega_{r,z}) y_s(t;j1), \tag{105}$$

$$M''_{12} = (\omega_{s,z} - \omega_{r,z}) x_s(t,j1) - (\omega_{s,x} - \omega_{r,x}) z_s(t;j1), \tag{106}$$

$$M''_{13} = (\omega_{s,x} - \omega_{r,x}) y_s(t;j1) - (\omega_{s,y} - \omega_{r,y}) x_s(t;j1), \tag{107}$$

$$M''_{21} = (\omega_r^2 + \omega_s^2) x_s(t;j2) + (\omega_r \cdot r_s) \omega_{r,x} + (\omega_s \cdot r_s) \omega_{s,x}, \tag{108}$$

$$M''_{22} = (\omega_r^2 + \omega_s^2) y_s(t;j2) + (\omega_r \cdot r_s) \omega_{r,y} + (\omega_s \cdot r_s) \omega_{s,y}, \tag{109}$$

$$M''_{23} = (\omega_r^2 + \omega_s^2) z_s(t;j2) + (\omega_r \cdot r_s) \omega_{r,z} + (\omega_s \cdot r_s) \omega_{s,z}, \tag{110}$$

$$\begin{aligned} M''_{31} &= (\omega_r^2 \omega_{s,y} - \omega_s^2 \omega_{r,y}) z_s(t; j3) - \\ &\quad (\omega_r^2 \omega_{s,z} - \omega_s^2 \omega_{r,z}) y_s(t; j3) - \\ &\quad 2((\omega_r \wedge \omega_s) \cdot r_s) \omega_{r,x} - \\ &\quad 2(\omega_s \cdot r_s)\{\omega_{s,y} \omega_{r,z} - \omega_{s,z} \omega_{r,y}\}, \end{aligned} \tag{111}$$

$$\begin{aligned} M''_{32} &= (\omega_r^2 \omega_{s,z} - \omega_s^2 \omega_{r,z}) x_s(t; j3) - \\ &\quad (\omega_r^2 \omega_{s,x} - \omega_s^2 \omega_{r,x}) z_s(t; j3) - \\ &\quad 2((\omega_r \wedge \omega_s) \cdot r_s) \omega_{r,y} - \\ &\quad 2(\omega_s \cdot r_s)\{\omega_{s,z} \omega_{r,x} - \omega_{s,x} \omega_{r,z}\}, \end{aligned} \tag{112}$$

-continued $$M''_{33} = (\omega_r^2 \omega_{s,x} - \omega_s^2 \omega_{r,x})y_s(t; j3) - \qquad (113)$$
$$(\omega_r^2 \omega_{s,y} - \omega_s^2 \omega_{r,y})x_s(t; j3) -$$
$$2((\omega_r \wedge \omega_s) \cdot r_s)\omega_{r,z} -$$
$$2(\omega_s \cdot r_s)(\omega_{s,x}\omega_{r,y} - \omega_{s,y}\omega_{r,x}),$$

$$G'''{}^{tr} = \{G''_1, G''_2, G''_3\}^{tr}, \qquad (114)$$

$$G''_1 = c|\Delta r|\Delta v(t;i;j1)/v_0, \qquad (115)$$

$$G''_2 = (c/v_0)|\Delta r| \, d\Delta v(t;i;j2)/dt - (c\Delta v(t;i;j2)/v_0)^2, \qquad (116)$$

$$G''_3 = (c|\Delta r|/v_0)d^2\Delta v(t;i;j3)/dt^2 - 3(c/v_0)^2 \Delta v(t;i;j3) d\Delta v/dt, \qquad (117)$$

$$X3 = \begin{bmatrix} x_r(t; i) \\ y_r(t; i) \\ z_r(t; i) \end{bmatrix}, \qquad (118)$$

Here, the satellite indices j1, j2 and j3 may be the same or may differ from each other, indicating that Doppler shift derivative measurements may be made using timed signals from the same satellite or from different satellites. The solution matrix X3 is found, as usual, by inverting the matrix M(t;i;j1; j2; j3):

$$X3 = M(t;i;j1;j2;j3)^{-1} G''(t;i;j1;j2;j3). \qquad (119)$$

Here, the solutions are the present values $(x_r(t;i), y_r(t;i), z_r(t;i))$ of the three location coordinates, not the "initial" values $(x_r(t0;i), y_r(t0;i), z_r(t0;i))$ of these coordinates. Note that no restrictions are imposed on the angular velocity vectors $\omega_r$ and $\omega_s$, except that each is referenced to the same origin, such as the Earth's center.

Figure 5:
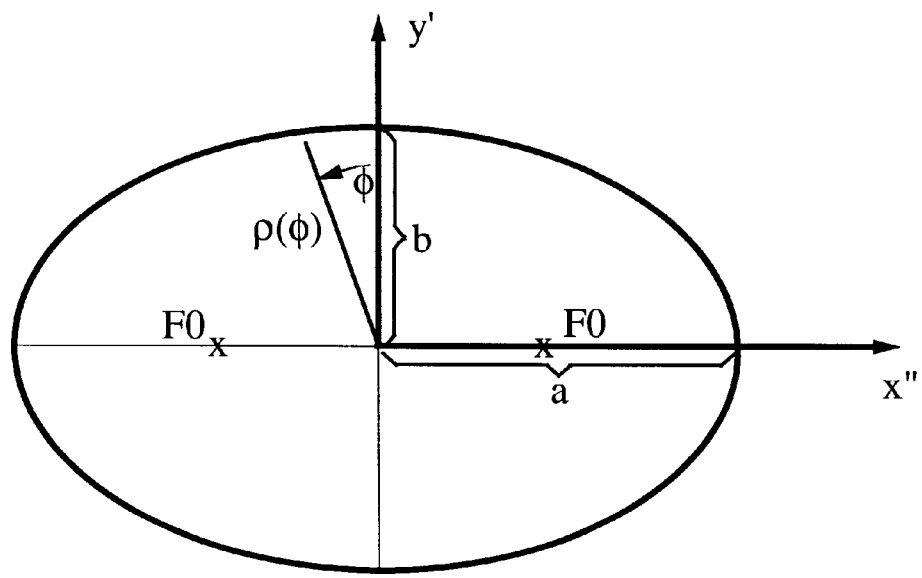
FIG. 5 illustrates analysis of an elliptical satellite orbit.

The orbit(s) of the satellite(s), assumed to be circular in Eqs. (13)–(15), may be extended to an elliptical orbit in the first embodiment, illustrated in FIG. 5, by the following development. The ellipse has a semi-major axis (x') of length a, a semi-minor axis (parallel to y') of length b, and an eccentricity $\epsilon$ given by $$\epsilon = \{1 - b^2/a^2\}^{1/2}, \qquad (120)$$

where b<a. The radius length $\rho$ of a line segment from an ellipse focus F0 to its intersection with the ellipse curve is given by $$\rho(\phi) = a(1-\epsilon^2)/(1+\epsilon \cos(\phi+\pi/2)), \qquad (121)$$

where $\phi$ is the angle the line segment makes with the y'-axis in FIG. 5. (K. R. Symon, *Mechanics*, Addison Wesley, Cambridge, Mass., 1953, pp. 111–114). Note that the azimuthal angle $\phi$ is defined with reference to the y'-axis rather than to the more conventional x'-axis. The analogues of Eqs. (13)–(15) for an elliptical orbit, instead of a circular orbit, are verified to be $$x_s(t;j) = \rho(\phi) \cos \Phi \cos \theta \cos \omega_s(t-t(j)) + \rho(\phi) \sin \Phi \sin \omega_s(t-t(j)), \quad (122)$$

$$y_s(t;j) = \rho(\phi) \sin \Phi \cos \theta \cos \omega_s(t-t(j)) + \rho(\phi) \cos \Phi \sin \omega_s(t-t(j)), \quad (123)$$

$$z_s(t;j) = \rho(\phi) \sin \theta \cos \omega(t-t(j)), \qquad (124)$$

$$\rho(\phi)^2 (d\phi/dt) = \text{constant} (\kappa), \qquad (125)$$

where the "anchoring" body is located at an ellipse focus F0 (FIG. 5) and $\kappa$ is a measure of the angular momentum of the orbiting satellite. Using a result found in G. Petit Bois, *Tables of Indefinite Integrals*, Dover Publs. New York, 1961, p. 118, Eq. (131) can be integrated to yield an implicit relation between $\phi$ and t for an elliptic orbit:

$$\kappa t = -\epsilon \cos \phi/\{(1-\epsilon^2)(1-\epsilon \sin \phi)\} + 2(1-\epsilon^2)^{-3/2} \tan^{-1}\{(\tan(\phi/2)-\epsilon)/(1-\epsilon^2)^{1/2}\}. \quad (126)$$

In some situations, it may not be possible to obtain sufficiently accurate measurements on signals from one or more satellites to provide values for pseudorange, Doppler shift and two time derivatives of Doppler shift (or, equivalently, of pseudorange and three time derivatives of pseudorange). For example, it may be possible only to obtain values of pseudorange and the first and second time derivatives of pseudorange for a satellite at the receiver. In this situation, receiver location can be estimated, using an approximation. Alternatively, this approximation may be used if one of the location fix coordinates, receiver clock offset $b_r$, is known to be small and is not of much interest. In this approximation, one returns to Eq. (25) and re-expresses this as an approximation, $$\Delta r \cdot \Delta r = x_{r0}^2 + y_{r0}^2 + z_{r0}^2 + a^2 - 2a z_{r0}\sin\theta\cos\omega_s t'' - \qquad (127)$$
$$2a x_{r0}\{\cos\theta\cos(\omega_e t' - \phi)\cos\omega_s t'' - \sin(\omega_e t' - \phi)\sin\omega_s t''\} -$$
$$2a y_{r0}\{\cos\theta\sin(\omega_e t' - \phi)\cos\omega_s t'' + \cos(\omega_e t' - \phi)\sin\omega_s t''\}$$
$$\approx PR(t; i; j)^2,$$

where presence of the receiver clock offset $b_r$ is ignored. The linear relations (73) are then used to express the quantities $x_{r0}$ and $y_{r0}$ in terms of $z_{r0}$, and Eq. (133) is restated as a quadratic equation in the remaining unknown, here $z_{r0}$.

$$(C_x(t; i; j1; j2) + D_x(t; i; j1; j2)z_{r0})^2 + \qquad (128)$$
$$(C_y(t; i; j1; j2) + D_y(t; i; j1; j2)z_{r0})^2 - 2a(C_x(t; i; j1; j2) +$$
$$D_x(t; i; j1; j2)z_{r0})\{\cos\theta\cos(\omega_e t' - \phi)\cos\omega_s t'' -$$
$$\sin(\omega_e t' - \phi)\sin\omega_s t''\} - 2a(C_y(t; i; j1; j2) +$$
$$D_y(t; i; j1; j2)z_{r0})\{\cos\theta\sin(\omega_e t' - \phi)\cos\omega_s t'' +$$
$$\cos(\omega_e t' - \phi)\sin\omega_s t''\} + z_{r0}^2 -$$
$$2a z_{r0}\sin\theta\cos\omega_s t'' + a^2 \approx PR(t; i; j)^2,$$

The more realistic solution $z_{r0}$ for Eq. (134) is then accepted and used in Eqs. (73)–(74) to determine the remaining initial location coordinates $x_{r0}$ and $y_{r0}$. Equations (1)–(3) can be used, as before, to determine the values of the x-, y- and z-coordinates of the receiver at some other selected time t.

Figure 6:
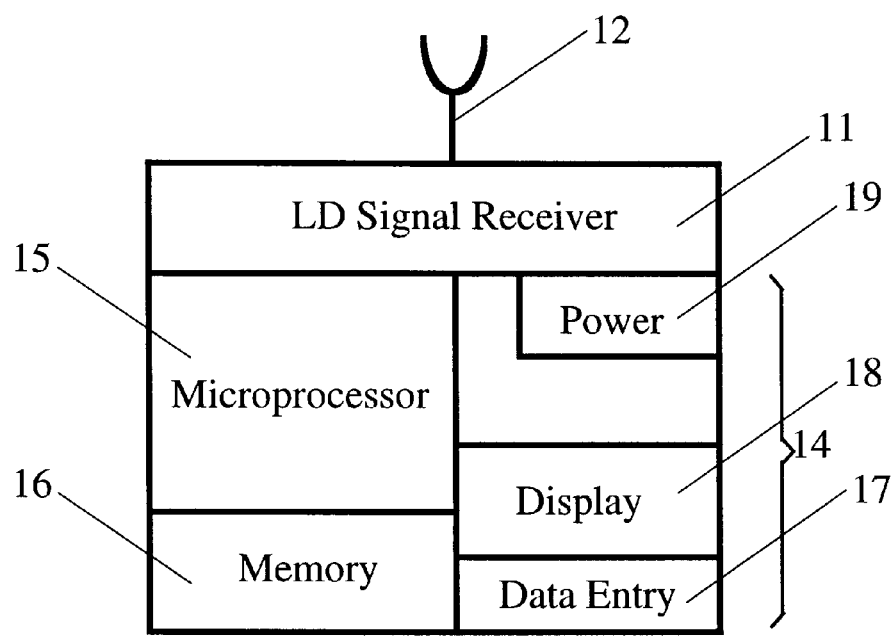
FIG. 6 illustrates apparatus to practice the invention.

FIG. 6 is a schematic view of apparatus suitable for practicing the invention and may be a console or be handheld. The apparatus includes an LD signal antenna 12 that receives and feeds LD signals to an LD signal receiver 11 for processing and determination of the LSM values. The LSM values are then passed to a computer 14, which may be part of the LD signal receiver 11 or may operate independently. The computer 14 includes a microprocessor 15 and associated memory module 16 that are programmed to perform the computations on the pseudorange values and Doppler shift time derivative values to determine the initial receiver location fix coordinate values $(x_{r0}, y_{r0}, z_{r0}, b_r)$, receiver coordinate values $(x_r(t), y_r(t), z_r(t))$ at some other selected time, elliptical orbit parameters, or any other relevant numerical quantity. The computer 14 optionally includes a data entry module 17, such as a keyboard or light pen, a visual and/or audible display 18 for the information computed or measured, and a power module to provide power for the other components shown in FIG. 6.

We claim:

1. A method for estimating location coordinates of a signal receiver from signals received from three satellites, the method comprising the steps of:
   receiving a timed signal from each of first, second and third satellites at a receiver at approximately a first selected time;
   determining at least one of a pseudorange value and a Doppler shift value, with these values being collectively denoted location signal measurement values or LSM values, for the timed signal received from each of the three satellites, where at least one of the LSM values is a Doppler shift value; and
   using the determined LSM values to estimate first and second location coordinate values for the receiver and at least one of a receiver time offset value and a third receiver location coordinate value, at a second selected time, determined with reference to the first selected time.

2. The method of claim 1, further comprising the steps of:
   determining a selected LSM value for said timed signal for a selected one of said satellites at approximately said first selected time, where at least one of said first, second and third LSM values and the selected LSM value is a pseudorange value; and
   estimating said receiver time offset value and said third location coordinate value from the selected LSM value and said estimated first and second location coordinate values for said receiver.

3. A method for estimating location coordinates of a signal receiver from signals received from one satellite, the method comprising the steps of:
   receiving a timed signal from a selected satellite at a receiver at approximately a first selected time;
   determining at least two of a pseudorange value, a Doppler shift value, a first selected combination of Doppler shift value and first time derivative of Doppler shift value, and a second selected combination of Doppler shift value and first and second time derivatives of Doppler shift value, with these values being collectively denoted location signal measurement values or LSM values, for the timed signal received from the satellite;
   using the at least two determined LSM values to estimate first and second location coordinate values for the receiver, at a second selected time determined with reference to the first selected time.

4. The method of claim 3, further comprising the steps of:
   determining a third LSM value, for the timed signal received from the satellite, at approximately said first selected time; and
   using the determined third LSM value and said estimated first and second location coordinate values to estimate at least one of a receiver time offset value and a third location coordinate value for said receiver, at said second selected time.

5. The method of claim 3, further comprising the steps of:
   determining third and fourth LSM values, for the timed signal received from the satellite, at approximately said first selected time, where at least one of said at least two LSM values and the third and fourth LSM values is a pseudorange value; and
   using the third and fourth LSM values and said estimated first and second location coordinate values to estimate a receiver time offset value and a third location coordinate value for said receiver, at said second selected time.

6. A method for estimating location coordinates of a signal receiver from signals received from two satellites, the method comprising the steps of:
   receiving a timed signal from each of first and second satellites at a receiver at approximately a first selected time;
   determining at least one of pseudorange value, Doppler shift value, a first selected combination of Doppler shift value and first time derivative of Doppler shift value, and a second selected combination of Doppler shift value and first and second time derivatives of Doppler shift value, with these values being collectively denoted location signal measurement values or LSM values, for the timed signal received from the first satellite;
   determining an LSM value for the timed signal received from the second satellite; and
   using the LSM values from the satellites to estimate first and second location coordinate values for the receiver, at a second selected time, determined with reference to the first selected time.

7. The method of claim 6, further comprising the steps of:
   determining a selected LSM value for said timed signal for a selected one of said satellites at approximately said first selected time; and
   estimating at least one of a receiver time offset value and a third receiver location coordinate value from the selected LSM value and said estimated first and second location coordinate values for said receiver.

8. The method of claim 6, further comprising the steps of:
   determining a second LSM value for said timed signal for each of said first and second satellites at approximately said first selected time, where at least one of said first LSM values and the second LSM values for said two satellites is a pseudorange value; and
   estimating a receiver time offset value and a third location coordinate value for said receiver from the second LSM values and said estimated first and second location coordinate values for the receiver.

9. Apparatus for estimating location coordinates of a signal receiver from signals received from three satellites, the apparatus comprising:
   a location determination unit that:
   receives a timed signal from each of first, second and third satellites at a receiver at approximately a first selected time; and
   determines at least one of a pseudorange value and a Doppler shift value, with these values being collectively denoted location signal measurement values or LSM values, for the timed signal received from each of the three satellites, where at least one of the LSM values is a Doppler shift value; and
   a computer that is programmed to use the determined LSM values to estimate first and second location coordinate values for the receiver and at least one of a receiver time offset value and a third receiver location coordinate value, at a second selected time, determined with reference to the first selected time.

10. The apparatus of claim 9, wherein:
    said location determination unit determines a selected LSM value for said timed signal for a selected one of said satellites at approximately said first selected time, where at least one of said first, second and third LSM values and the selected LSM value is a pseudorange value; and said computer is further programmed to estimate said receiver time offset value and said third location coordinate value from the selected LSM value and said estimated first and second location coordinate values for said receiver.

11. Apparatus for estimating location coordinates of a signal receiver from signals received from one satellite, the apparatus comprising:

a location determination unit that:
receives a timed signal from a selected satellite at a receiver at approximately a first selected time; and
determines at least two of a pseudorange value, a Doppler shift value, a first selected combination of Doppler shift value and first time derivative of Doppler shift value, and a second selected combination of Doppler shift value and first and second time derivatives of Doppler shift value, with these values being collectively denoted location signal measurement values or LSM values, for the timed signal received from the satellite;

a computer that is programmed to use the at least two determined LSM values to estimate first and second location coordinate values for the receiver, at a second selected time determined with reference to the first selected time.

12. The apparatus of claim 11, wherein:
said location determination unit determines a third LSM value, for the timed signal received from the satellite, at approximately said first selected time; and
said computer is further programmed to use the determined third LSM value and said estimated first and second location coordinate values to estimate at least one of a receiver time offset value and a third location coordinate value for said receiver, at said second selected time.

13. The apparatus of claim 11, wherein:
said location determination unit determines third and fourth LSM values, for the timed signal received from the satellite, at approximately said first selected time, where at least one of said at least two LSM values and the third and fourth LSM values is a pseudorange value; and
said computer is further programmed to use the third and fourth LSM values and said estimated first and second location coordinate values to estimate a receiver time offset value and a third location coordinate value for said receiver, at said second selected time.

14. Apparatus for estimating location coordinates of a signal receiver from signals received from two satellites, the apparatus comprising:

a location determination unit that:
receives a timed signal from each of first and second satellites at a receiver at approximately a first selected time;
determines at least one of pseudorange value, Doppler shift value, a first selected combination of Doppler shift value and first time derivative of Doppler shift value, and a second selected combination of Doppler shift value and first and second time derivatives of Doppler shift value, with these values being collectively denoted location signal measurement values or LSM values, for the timed signal received from the first satellite; and
determines an LSM value for the timed signal received from the second satellite; and a computer programmed to use the LSM values from the satellites to estimate first and second location coordinates values for the receiver, at a second selected time, determined with reference to the first selected time.

15. The apparatus of claim 14, wherein:
said location determination unit determines a selected LSM value for said timed signal for a selected one of said satellites at approximately said first selected time; and
said computer is further programmed to estimate at least one of a receiver time offset value and a third receiver location coordinate value from the selected LSM value and said estimated first and second location coordinate values for said receiver.

16. The apparatus of claim 14, wherein:
said location determination unit determines a second LSM value for said timed signal for each of said first and second satellites at approximately said first selected time, where at least one of said first LSM values and the second LSM values for said two satellites is a pseudorange value; and
said computer is further programmed to estimate a receiver time offset value and a third location coordinate value for said receiver from the second LSM values and said estimated first and second location coordinate values for the receiver.

* * * * *